United States Patent [19]

Donnan

[11] 4,439,859
[45] Mar. 27, 1984

[54] METHOD AND SYSTEM FOR RETRANSMITTING INCORRECTLY RECEIVED NUMBERED FRAMES IN A DATA TRANSMISSION SYSTEM

[75] Inventor: Robert A. Donnan, Chapel Hill, N.C.

[73] Assignee: International Business Machines Corp., Armonk, N.Y.

[21] Appl. No.: 291,672

[22] Filed: Aug. 10, 1981

[30] Foreign Application Priority Data

Aug. 26, 1980 [EP] European Pat. Off. ........ 80430015.0

[51] Int. Cl.³ .............................................. G08C 25/00
[52] U.S. Cl. ......................................... 371/32; 371/30
[58] Field of Search ........................ 371/30, 32, 12, 72

[56] References Cited

U.S. PATENT DOCUMENTS

| | | | |
|---|---|---|---|
| 3,618,017 | 11/1971 | Murayama et al. | 371/32 |
| 3,641,494 | 2/1972 | Perravlt et al. | 371/32 |
| 3,824,547 | 7/1974 | Green et al. | 371/32 |
| 3,879,577 | 4/1975 | Progler | 371/32 |
| 3,979,719 | 9/1976 | Tooley et al. | 371/32 |
| 4,144,522 | 3/1979 | Kageyama et al. | 371/32 |
| 4,237,338 | 12/1980 | Hecht | 371/32 |
| 4,246,442 | 1/1981 | Hashimoto | 371/30 |
| 4,347,603 | 8/1982 | Jacob et al. | 371/32 |

Primary Examiner—Jerry Smith
Assistant Examiner—Gary V. Harkcom
Attorney, Agent, or Firm—John B. Frisone

[57] ABSTRACT

A method and a system for the retransmission of incorrectly received frames in a transmission system in which information is transmitted in the form of sequentially numbered frames. Each information frame includes a so-called send sequence number, N(S), a bit, R, indicating if this information frame has previously been retransmitted, and an information field containing the information to be transmitted. At the transmitting station, a variable, V(T), whose value indicates the order in which a frame is retransmitted relative to the sequence of frames transmitted for the first time, is associated with each retransmitted frame. At the receiving station, the incoming information frames are checked for errors and the N(S) of frames found to be incorrect is noted. The receiving station then sends to the transmitting station a so-called Checkpoint (CP) message containing a so-called receive sequence number, N(R), which indicates the send sequence number, N(S), of the most recently received, non-retransmitted, error-free information frame, and, if at least one incorrect frame has been received, at least one identifier, N(X), which indicates the N(S) of the incorrect frame whose retransmission is requested. Upon receipt of the Checkpoint message, the transmitting station retransmits requested information frames that have not been previously retransmitted; it also retransmits previously retransmitted frames, only if the V(T) values associated therewith are pg,2 less than the receive sequence number, N(R), contained in the CP message; and it updates the V(T) value associated with each frame thus retransmitted. In a preferred embodiment of the invention, the Checkpoint messages are transmitted on a periodic basis. Each of these contains an X bit whose value indicates whether the values between N(R) and the highest N(X) are also to be considered as N(X) values.

8 Claims, 12 Drawing Figures

FIG. 2
START I/O
FIG. 3
CCW
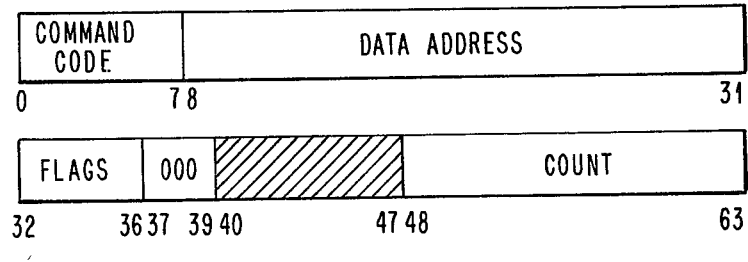
FIG. 4
FIG. 5
CSW
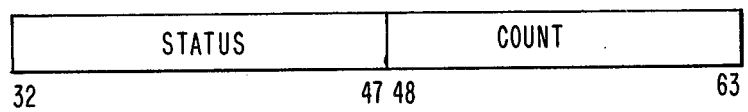

FIG. 6
SACM COMMAND
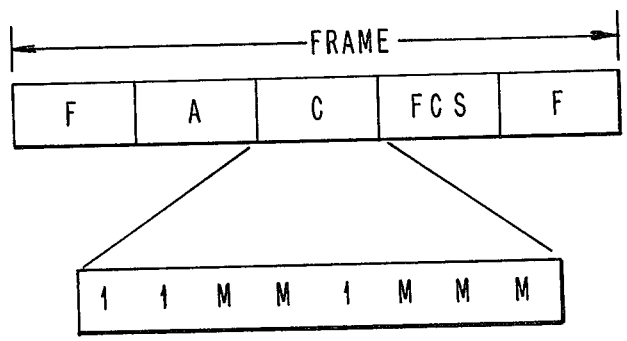
FIG. 7
FRAME I
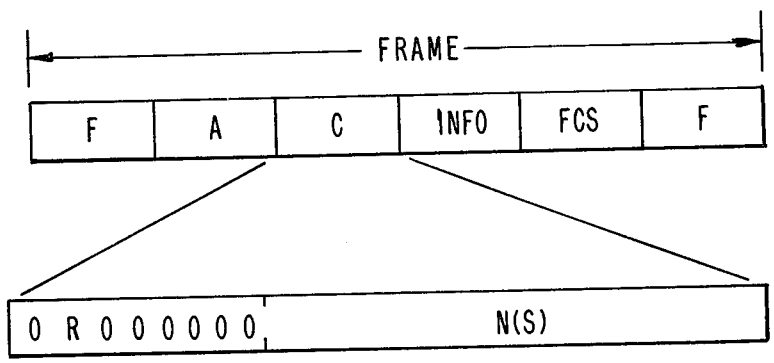
FIG. 8
RETRANSMIT TABLE
| N(S) | V(T) |
|------|------|
| N(S) | V(T) |
| ⋮    | ⋮    |
| N(S) | V(T) |

CP MESSAGE

RECEIVE TABLE

METHOD AND SYSTEM FOR RETRANSMITTING INCORRECTLY RECEIVED NUMBERED FRAMES IN A DATA TRANSMISSION SYSTEM

BACKGROUND OF THE INVENTION

1. Field of the Invention

This invention relates to data transmission systems in which a transmitting station sends sequentially numbered information frames to a receiving station, and, more particularly, to a method and a system for controlling the retransmission by the sending station of incorrect information frames. This invention is especially useful in those data transmission systems which use a control procedure of the type known as the HDLC (High-Level Data Link Control) procedure.

2. Description of the Prior Art

In data transmission systems using a HDLC-type of control procedure, each station transmits information organized in a specific format called an information frame, and all frames so transmitted are sequentially numbered. The receiving station checks the incoming frames for transmission errors and requests the sending station to retransmit incorrect frames through the use of a Reject (REJ) command or a Selective Reject (SREJ) command. The REJ command contains a frame number and is used to request the retransmission of all information frames starting at that number. The SREJ command is similar to the REJ command, but is only used to request the retransmission of the specific frame whose number appears in the SREJ command. Both commands also serve to acknowledge the receipt of all frames preceding the one whose number appears therein.

However, in data transmission systems operating at megabit rates and exhibiting round-trip propagation delays of the order of 500 ms and more, as in satellite transmission systems, the use of the REJ and SREJ commands presents some problems, as the following example will show.

Let us assume that a data link between Station A and Station B exhibits a round-trip propagation delay equivalent to the transmission of 39 frames, that Station A sequentially transmits frames numbered 00, 01, 02, etc., and that frames 03 and 06 are not correctly received by Station B. Upon receipt of frame 04, Station B will discard frame 04 and all subsequent frames and will transmit a REJ command requesting reinitiation of the sequential transmission of frames starting at frame 03, which command also acknowledges the receipt of frames 02 and below. However, because of the propagation delay, frames 00 to 43 have already been transmitted by Station A before the REJ command is received, with the result that the time spent in transmitting frames 04 through 43 is lost.

In the foregoing example, a SREJ could have been used to request the retransmission of frame 03. However, since the SREJ command, like the REJ command, acknowledges the receipt of all frames preceding the one whose retransmission has been requested, a request for the retransmission of frame 06 cannot be initiated until frame 03 has been correctly received. Consequently, only one SREJ command can be sent per round-trip propagation delay.

The foregoing shows that, in transmission systems exhibiting significant round-trip propagation delay, the use of REJ or SREJ commands will cause major degradation in throughput, assuming average transmission error rates.

SUMMARY OF THE INVENTION

It is, therefore, the object of this invention to provide, in a transmission system in which information is transmitted in the form of sequentially numbered frames, a method and a system for the retransmission of incorrectly received frames which will yield substantial improvements in throughput in systems exhibiting significant round-trip propagation delay.

Generally, in the system of the present invention, each information frame includes a so-called send sequence number, $N(S)$, a bit, R, indicating if this information frame has previously been transmitted, and an information field containing the information to be transmitted. At the transmitting station, a variable, $V(T)$, whose value is representative of the order in which a frame is retransmitted relative to the sequence of frames transmitted for the first time, is associated with each retransmitted frame.

At the receiving station, the incoming information frames are checked for errors and the $N(S)$ of frames found to be incorrect is noted. The receiving station then sends to the transmitting station a so-called Checkpoint (CP) message containing a so-called receive sequence number, $N(R)$, representative of the send sequence number $N(S)$, of the most recently received, non-retransmitted, error-free information frame, and, if at least one incorrect frame has been received, at least one identifier, $N(X)$, representative of the $N(S)$ of the incorrect frame whose retransmission is requested. Upon receipt of the Checkpoint message, the transmitting station retransmits requested information frames that have not been previously retransmitted; it also retransmits previously retransmitted frames, only if the $V(T)$ values associated therewith are less than the receive sequence number, $N(R)$, contained in the CP message; and it updates the $V(T)$ value associated with each frame thus retransmitted.

In a preferred embodiment of the invention, the Checkpoint messages are transmitted on a periodic basis. Each of these contains an X bit whose value indicates whether the values between $N(R)$ and the highest $N(X)$ are also to be considered as $N(X)$ values. Other bits in the information frame or in the CP message are for other functions not associated with this invention or are reserved for future use.

The foregoing and other objects, features and advantages of the invention will be apparent from the following more particular description of a preferred embodiment of the invention, as illustrated in the accompanying drawings.

BRIEF DESCRIPTION OF DRAWINGS

FIG. 2 shows the format of a Start I/O instruction.

FIG. 3 shows the format of a channel command word (CCW).

FIG. 4 shows the format of a channel address word (CAW).

FIG. 5 shows the format of a channel status word (CSW).

FIG. 6 shows the format of a frame containing a SACM command.

FIG. 7 illustrates the format of an information (I) frame.

FIG. 8 illustrates the content of the retransmit table of the control unit.

Before proceeding to a detailed description of the present invention, it may be helpful to briefly review the essential aspects of the HDLC procedure. The basic purpose of the HDLC procedure is to allow information to be exchanged between two data stations located at the respective ends of a synchronous data link system. All transmissions are organized in a specific format called a frame. Each frame has the same format, namely:

F, A, C, Info, FCS, F and is made up of:

a beginning flag (F) that indicates the beginning of the frame,
an address (A) that is the address of the remote station,
a control (C) field that specifies the purpose of the frame,
an optional information (Info) field that contains the information to be transmitted,
a frame check sequence (FCS) field that enables the receiving station to check that the frame is free of transmission errors, and
an ending flag (F) that signals the end of the frame.

The control field can define one of three types of frames:

Information (I) frame which, as the name implies, is used for the transfer of information between the stations.
Supervisory (S) frame which is used to acknowledge the receipt of information frames and to request the retransmission of those found to be in error.
Unnumbered (U) frames which are mainly used for data link initialization and disconnection, for exchange of station identification and for reporting certain procedural errors.

The data link, and in turn the stations, may be in one of two mode:

Disconnected Mode, in which only unnumbered frames may be transmitted.
Operational Mode, in which information frames and supervisory frames as well as unnumbered frames may be transmitted. In the present invention, the specific operational mode is termed Asynchronous Checkpoint Mode.

For mode details, reference may be made, for example, to International Standards IS 3309 and IS 4335 as well as to the public document entitled "IBM Synchronous Data Link Control—General Information" (GA27-3093-2).

DESCRIPTION OF THE PREFERRED EMBODIMENT

Figure 1:
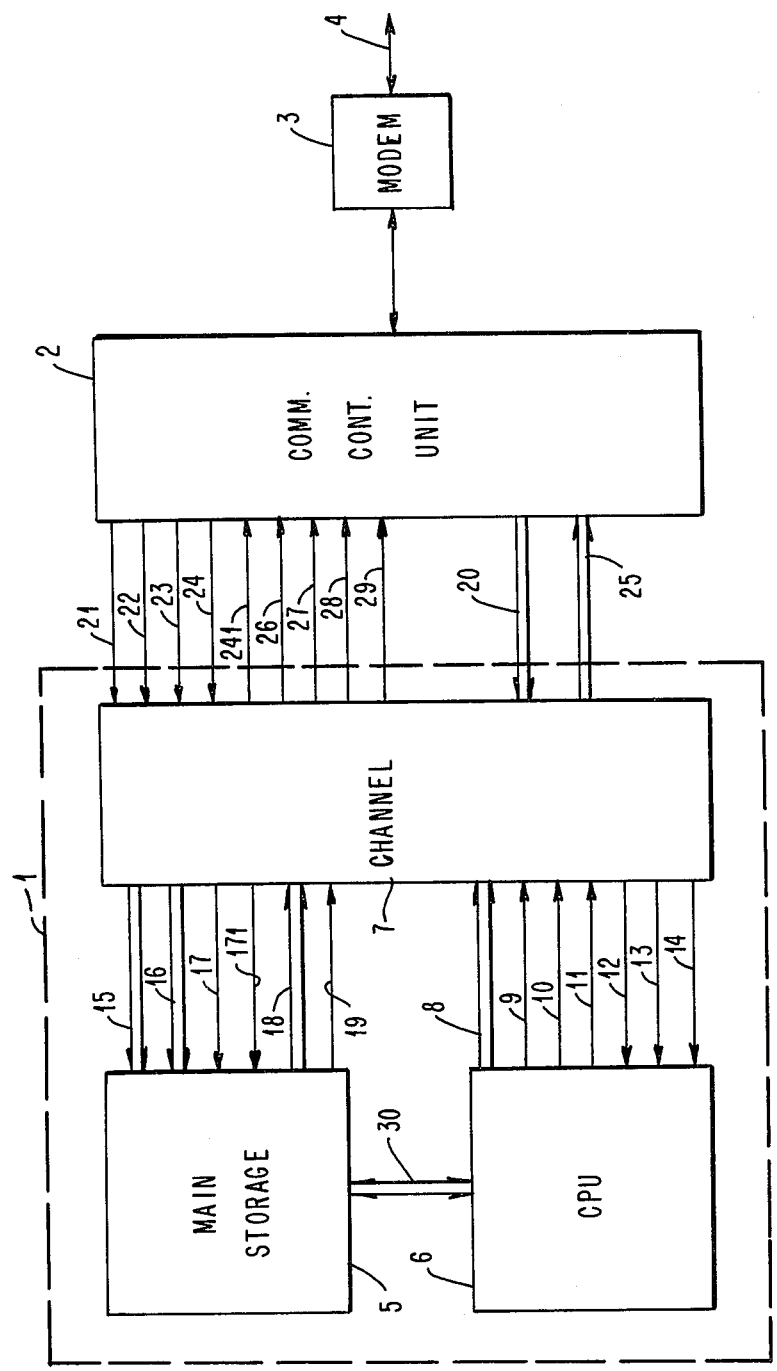
FIG. 1 illustrates a data station incorporating the present invention.

Referring now to FIG. 1, a block diagram of a data station incorporating the invention is shown. The data station includes a computer 1, a front-end communication unit 2 which, in the exemplary embodiment described herein, is a communication control unit, and a modem 3 which connects the data station to a transmission medium represented in the figure as a transmission line 4. The computer 1 may be an IBM System/360 or an IBM System/370 computer, and only those elements thereof which are helpful in understanding the invention have been shown in the figure. Such elements consist of a main storage 5, a central processing unit (CPU) 6 and a channel 7.

The CPU 6 includes facilities for addressing main storage, for fetching and storing information, for arithmetic and logical processing of data, for sequencing instructions in the desired order, and for initiating communications between main storage and the external units connected thereto.

The channel 7 controls transfer of data between main storage 5 and remote data stations connected to the data station of FIG. 1 via transmission line 4. Channel 7 connects with CPU 6, main storage 5 and control unit 2.

The channel relieves the CPU of the burden of communicating directly with the remote data stations and permits data processing in computer 1 to proceed concurrently with input/output (I/O) operations.

I/O operations involve the transfer of information between main storage and the remote data stations. Control unit 2 controls the exchange of data between the station of FIG. 1 and the remote data stations, and includes the logical circuits and buffers required for this purpose.

The modem 3 converts the data pulses provided by control unit 2 into signals that can be sent over the transmission medium and vice versa.

In what follows, CPU 6 and main storage 5, which may consist, for example, of the corresponding hardware used in the IBM System/360 or IBM System/370 computers, will not be described since extensive literature exists on these units.

The channel 7 is connected to CPU 6, main storage 5 and control unit 2 through various buses and control lines. For clarity, only those buses and control lines which are necessary for the purposes of the present description have been shown in FIG. 1.

Connections between the Channel and the CPU

From the CPU to the channel:

Address bus 8: This bus is used to transmit the address of the selected I/O device.
Start line 9: This line is used to signal the start of an I/O operation.
Channel Selection line 10: This line is used to cause the channel to initiate an I/O operation.
Interruption line 11: This line is used to cause the interruption of a current I/O operation.

From the channel to the CPU:

Status lines 12 and 13: These lines are used to indicate the status of the channel.

Interruption Request line 14: This line is used to signal to the CPU that the channel is requesting an interruption of the current I/O operation.

Connections between the Channel and Main Storage

From the channel to main storage:

Bus 15: This is the main storage address bus.
Bus 16: This is the main storage data input bus.
Write Request line 17: This line is used to signal that the channel requests the transfer thereto of the content of the storage location addressed by bus 15.
Read Request line 171: This line is used to signal that the channel requests the loading of an 8-bit byte in the storage location addressed by bus 15.

From main storage to the channel:

Bus 18: This is the main storage data output bus.
Address Accepted line 19: This line is used to signal that the address present on bus 15 has been accepted.

Connections between the Channel and the Control Unit

From the control unit to the channel:

Bus 20: This is the input bus to the channel.
Operational In line 21: This line is used to signal that the control unit has been selected and is communicating with the channel.
Address In line 22: This line is used to signal when an address has been placed on bus 20 by the control unit.
Status In line 23: This line is used to signal that a status indication has been placed on bus 20 by the control unit.
Service In line 24: This line is used to signal to the channel when the control unit wants to transmit or receive an 8-bit byte.
Request In line 241: This line is used to signal to the channel when the control unit is ready to transmit data or status information thereto and wants to be selected.

From the channel to the control unit:

Bus 25: This is the output bus from the channel.
Command Out line 26: This line is used to signal that a command has been placed on bus 25 by the channel.
Address Out line 27: This line is used to signal that an address has been placed on bus 25 by the channel.
Service Out line 28: This line is used to signal that the channel has accepted the information present on bus 20 or has provided on bus 25 the information requested through Service In.
Select Out line 29: This line is used to select the control unit.

Connections between the CPU and Main Storage

These connections are not relevant to the description of the invention and have been represented by a bidirectional bus 30.

Before describing in detail the station of FIG. 1 and its operation, a brief description of the formats of the instructions and control words being utilized will be given.

Referring now to FIG. 2, there is shown the format of the instruction Start I/O used by the CPU to initiate an I/O operation.

The instruction Start I/O is comprised of 32 bits.

Bit positions 0–7 define the operation code specifying this instruction.

Bit positions 8–15 are ignored.

Bit positions 16–23 contain the channel address, while bit positions 24–31 identify the control unit and the addressed remote station. Referring next to FIG. 3, the format of a channel command word (CCW) is shown. This 64-bit word specifies the command to be executed and, for commands initiating I/O operations, it designates the storage area associated with the operation and the action to be taken whenever data transfer to or from that area is completed.

The fields in the CCW are allocated for the following purposes:

Command code: Bits 0–7 specify the operation to be performed.

Data Address: Bits 8–31 specify the address of an 8-bit byte in main storage. It is the first storage location referred to in the area designated by the CCW.

Chain-Data (CD) Flag: Bit 32, when "1", specifies chaining of data. The storage area designated by the next CCW will then be used with the current operation.

Chain Command (CC) Flag: When bit 33 is "1" and bit 32 is "0", chaining of commands is specified, in which case the operation identified by the command code in the next CCW is automatically initiated upon normal completion of the current operation.

Suppress-Length-Indication (SLI) Flag: Bit 34 controls whether an incorrect length condition is to be indicated to the program. When this bit is "1" and the CD flag is "0" in the last CCW used, the incorrect length indication is suppressed. When both the CC and SLI flags are "1", command chaining takes place regardless of the presence of an incorrect length condition.

Skip (SKIP) Flag: This bit (bit 35), when "1", specifies suppression of transfer of information to storage during a Read, Read Backward, or Sense operation.

Program-controlled-Interruption (PCI) Flag: This bit (bit 36), when "1", causes the channel to generate an interruption condition when the CCW takes control of the channel. When this bit is "0", normal operation takes place.

Count: Bits 48–63 specify the number of 8-bit byte locations in the storage area designated by the CCW.

Bit positions 37–39 contain zeros. The content of bit positions 40–47 is ignored.

Referring next to FIG. 4, there is shown the format of the channel address word (CAW). This word specifies the storage protection key and the address of the first CCW associated with the instruction Start I/O. It is assigned a fixed address in main storage.

The fields of the CAW are allocated for the following purposes:

Protection Key: Bits 0–3 form the protection key for all commands associated with Start I/O. This key is compared with a key in storage whenever reference is made to a main storage area.

Command Address: Bits 8–31 designate the location of the first CCW in main storage.

Referring next to FIG. 5, there is shown the format of the channel status word (CSW). The CSW provides to the program the status of an I/O device or the condition under which an I/O operation has been terminated. The CSW is formed, or parts of it are replaced, in particular, in the process of I/O interruptions and during execution of Start I/O. The CSW is placed in main storage at a fixed address and is available to the program at this address until the time the next I/O interruption occurs or until another I/O instruction causes its content to be replaced.

The fields in the CSW are allocated for the following purposes:

Protection Key: Bits 0–3 form the protection key in storage used in the chain of operations.

Command Address: Bits 8–31 form the address, which is eight higher than the address of the last CCW used.

Status: Bits 32–47 identify the conditions in the device and the channel that caused the storing of the CSW.

Count: Bits 48–63 form the residual count for the last CCW used.

The formats described with reference to FIGS. 2 to 5 are those used in the IBM System/360 and IBM System/370 computers. For more details, reference to the IBM document entitled "IBM System/370—Principles of Operation", Form GA22-7000-5, File No. S/370-01, is suggested.

The operation of the data station of FIG. 1, which incorporates the present invention, will now be described.

To simplify the present description, it will be assumed that the station shown in FIG. 1 (referred to hereafter as the local station) is connected to a single remote station which is identical thereto. In accordance with the invention, each station transmits Information, Supervisory and Unnumbered frames.

It will further be assumed that the application program being executed in computer 1 wants to cause several data blocks to be transmitted to the remote station. Each of these blocks comprises a predetermined number of 8-bit bytes and is located in main storage 5. Before transmitting the data blocks, the local station must set the remote station to a suitable mode of operation, referred to as "Asynchronous Checkpoint Mode" (ACM), unless of course it already is in that mode. The object of this mode of operation, which is specific to the present invention, will become apparent as the description progresses.

The remote station is set to the ACM by the local station by means of a command called "Set Asynchronous Checkpoint Mode (SACM) command", which may be transmitted through the use of, for example, the Unnumbered type of frame provided for in the HDLC procedure (see FIG. 6). This frame, as used to transmit the SACM command, comprises a frame beginning flag (F) having the conventional binary configuration 01111110, an address (A) which is the address of the remote station, a control (C) field containing the SACM command, a frame check sequence (FCS) field, and a frame ending flag (F) identical to the frame beginning flag. The SACM command is comprised of an 8-bit byte in which bits 1 and 2 are both set to "1", thereby identifying an Unnumbered frame, bit 5 is also set to "1", which indicates that a response is requested, and the remaining bits (designated M) have a predetermined value identifying a SACM command.

To transmit the SACM command, the application program being executed in the local station's computer sets the required information in a channel command word (CCW). This information is as follows:

Command code: Write code
Data Address: Address of the storage location in which the SACM command is stored
Flags: 0
Count: 1

The application program sets the channel address, the control unit address and the remote station address in the instruction Start I/O, sets the address of the CCW associated with the SACM command in the address field of the channel address word (CAW), and transfers control of the operations to the supervisory program, which initiates transmission of the SACM command by executng Start I/O. The CPU 6 responds to this instruction by raising Start line 9 and Channel Selection line 10, and by placing the address contained in Start I/O on Address bus 8. The channel 7 detects the condition of lines 9 and 10 and, if busy, signals that fact to the CPU 6 by placing an appropriate condition code on Status lines 12 and 13.

If the channel is not busy, it initiates a control unit selection operation. To this end, the channel stores the address present on Address bus 8 and requests main storage to send the CAW by raising Write REquest line 17 and placing the address of the CAW on bus 15. Main storage 5 places the CAW on bus 18 and raises Acceptance line 19. The channel causes the address of the CCW contained in the CAW to be stored in a command address register. The channel then requests main storage 5 to transfer the CCW thereto by raising Write Request line 17 and placing the address of the CCW on bus 15. Main storage 5 transfers the CCW to the channel, which stores the contents of the Data Address, Flags and Count fields in appropriate registers and increments by eight the address stored in its command address register.

The channel 7 sends the address of the device it received from CPU 6 to the control unit by placing the address on output bus 25 and raising Address Out line 27 and Select Out line 29. Control unit 2 detects the condition of lines 27 and 29, decodes the address of the device and, if it accepts same, raises Operational In line 21 and Address In line 22 and places the address on input bus 20. The channel compares the address of the device received from the control unit with that received from the CPU and, if they match, sends the command code in the CCW to control unit 2 by placing same on output bus 25 and raising Command Out line 26. If it accepts the command, the control unit raises Status In line 23 and places suitable status information such as zero status information on input bus 20. In response thereto, the channel frees the CPU by placing the appropriate condition code on status lines 12 and 13. This completes the selection of the control unit.

The control unit, when it detects the Write command, places the frame beginning flag, then the address of the remote station on the transmission line and requests the channel to provide the 8-bit byte to be transmitted by raising Service In line 24. In response thereto, the channel raises Write Request line 17, places on bus 15 the data address contained in the CCW associated with the SACM command, increments this address by one, and decrements the content of its count register by one. The SACM command is placed on data output bus 18 by main storage and is transmitted to the control unit via output bus 25 by the channel, which raises Service Out line 28. The control unit transmits this command within the control field of the frame, then requests the channel to provide the second byte to be transmitted by raising Service In line 24. Since the count register has a zero value, the channel raises Command Out line 26, thereby signaling a stop condition to the control unit. In response, the control unit successively places on the transmission line the frame check sequence (FCS) and the frame ending flag in accordance with the HDLC procedure, raises Status In line 23, and places the conditions Channel End and Device End on the input bus.

In response thereto, the channel checks the value of the CC flag bit in the current CCW, i.e. in the CCW associated with the SACM command, and since this bit is "0", the channel initiates a request to CPU 6 for an I/O interruption by raising Interruption Request line 14, and waits for CPU 6 to raise Interruption line 11. The channel then places on data input bus 16 the conditions which caused the operation to be interrupted in order that the appropriate CSW bits may be set accordingly.

Control is now turned over to the supervisory program. This program determines which application program requested the I/O operation just completed and transfers control thereto. The application program, which is waiting for a response to the SACM command, then initiates a Read operation.

The remote station receives the SACM command and, if it accepts same, sends an acknowledgement to the local station. This may take the form of the Unnumbered Acknowledgment (UA) response which is provided for in the HDLC procedure and which only differs from the SACM command in that bit 5 of the control field is set to "0" instead of "1". The UA response is received by control unit 2 in the local station and stored, if the frame containing it is correct, in a buffer until a Read operation is initiated by channel 7. The application program in computer 1 sets the information necessary to read the UA response in a CCW, namely:

Command Code: Read code
Data Address: Address of the storage location in which the UA response is to be stored.
Flags: 0
Count: 1

The application program sets the channel, the control unit address and the remote station address in an instruction Start I/O, sets the address of the CCW associated with the UA response in the address field of the CAW, and transfers control of the operations to the supervisory program, which then initiates reading of the UA response by executing Start I/O. Selection of the control unit takes place as previously described. Upon detecting the Read command received from the channel, the control unit raises Service In line 24 and places the UA response, then the conditions Device End and Channel End, on input bus 20, as explained earlier. The channel transfers the UA response to main storage 5 via storage data input bus 16 and requests an interruption to update the CSW, as has been seen.

Transmission of the data blocks is then initiated by the application program. Each data block is sent to the remote station as an information (I) frame whose format is shown in FIG. 7. The frame is conventionally made up of a beginning flag (F), the address (A) of the remote station, a control (C) field, an information (Info) field containing the data to be transmitted, a frame check sequence (FCS) and an ending flag (F). However, the configuration of the control (C) field is specific to the invention, as described below:

| | |
|---|---|
| Bit 1 = 0 | I frame identifier |
| Bit 2 = R | Retransmission bit. When R = 1, it indicates that this I frame is a retransmission. |
| Bits 3-8 = 0 | Reserved |
| Bits 9-24 = N(S) | Send sequence number of the frame. In the example shown, this is a 16-bit number. |

It will be assumed that the application program has set the information required to transmit each data block in a CCW. This information is as follows:

| | |
|---|---|
| Command Code | Write code |
| Data Address | Address of the first location in the storage area that contains the data block to be transmitted |
| CD Flag | |
| CC Flag | |
| SLI Flag | In accordance with the application program |
| SKIP Flag | |
| PCI Flag | |
| Count | Number of 8-bit byte locations in the storage area that contains the data block to be transmitted. |

The application program sets the channel address, the control unit address and the remote station address in an instruction Start I/O, sets the address of the first CCW associated with the first data block to be transmitted in the address field of the CAW, and transfers control of the operations to the supervisory program, which initiates transmission of the first block by executing the instruction Start I/O. The control unit is then selected as described earlier.

Upon detecting the Write command associated with the current CCW, the control unit places the frame beginning flag, then the address of the receiving station on the transmission line and requests the channel to provide the first 8-bit byte of the first block to be transmitted by raising Service In line 24. In response thereto, the channel raises Write Request line 17, places on storage address bus 15 the data address contained in the CCW, increments this address by one and decrements the content of its count register by one. The first 8-bit byte is placed on data output but 18 by main storage 5 and is retransmitted to the control unit via output bus 25 by the channel, which raises Service Out line 28. This byte is the first byte of the control field of the information frame shown in FIG. 7, i.e. the byte that contains the R bit. This byte is stored in, and transmitted by, the control unit, which then requests the channel to supply the second and third 8-bit bytes, as described earlier. The latter two bytes, which make up the send sequence number, N(S), of the current frame, are sent over the transmission line and also stored, if the R bit in the first byte is set to "1", in a so-called retransmit table (see FIG. 8) contained in a control unit buffer. A variable, V(T), whose value is representative of the order in which a corresponding frame is retransmitted relative to the sequence of frames transmitted for the first time, is associated with each of the N(S) stored in the retransmit table. The control unit transmits the second and third 8-bit bytes, then requests and successively transmits the other bytes in the data block to be transmitted, which bytes make up the information field of the frame, until the content of the count register associated with the channel becomes zero. When this occurs and when the control unit raises Service In line 24, the channel responds by raising Command Out line 26, thereby signaling a stop condition to the control unit. In response, the control unit successively places on the transmission line the frame check sequence (FCS) and the ending flag, both of which are provided for in the HDLC procedure, raises Status In line 23 and places the conditions Channel End and Device End on input but 20. The channel then checks the value of the CC flag in the current CCW. If this bit is one, specifying chaining of commands, the channel requests main storage to transfer thereto the next CCW whose address is contained in the command address register associated with the channel, and the second data block is then transmitted.

If the CC flag bit is zero, the channel initiates a request to CPU 6 for an I/O interruption by raising Interruption Request line 14, and waits for CPU 6 to raise Interruption line 11. The channel then places on data input bus 16 the conditions which caused the operation to be interrupted in order that they may be set in the CSW.

The application program then initiates transmission of the second data block, which is carried out in the same manner as that of the first data block, and so forth.

The remote station checks the incoming information frames for errors, using in particular the frame check sequences (FCS), and discards those found to be in error. The send sequence numbers, N(S), of frames correctly received are stored by the remote station in a so-called receive table contained in its main storage. After a predetermined number of frames have been received, or after a predetermined time interval has elapsed, the remote station sends a Checkpoint (CP) message to the local station. The duration of said time interval is dependent, in particular, on the transmission speed and on the frame propagation time between the two stations; on a satellite link operating at 64 Kbps or more, a time interval of about 100 ms appears to be appropriate. The CP message may be sent to the local station using, for example, the Supervisory (S) frame provided for in the HDLC procedure (see FIG. 9). Each Supervisory (S) frame is conventionally comprised of a beginning flag (F), the address (A) of the remote station, a control (C) field, a frame check sequence (FCS) field, and an ending flag (F). The control field contains the CP message as follows:

| | |
|---|---|
| Bit 1 = 1 and Bit 2 = 0 | These two bits identify a S frame. |
| Bit 3 = X | The use of this bit is described below. |
| Bits 4–8 | Reserved |
| Bits 9–24 = N(R) | The value of the receive sequence number N(R) is one greater than the value of the N(S) of the most recently received information frame whose R bit equalled zero. The N(R) acknowledges the receipt of all information frames up to the value of N(R), except as follows: |
| Bits 25–n = N(X) field | This field contains identifiers designated N(X) which are arranged in descending order and whose values are equal to the N(S) of the errored frames received by the remote station, with said N(S) being less than N(R). When the X bit is set to "1", those values which are between the N(R) and the highest N(X) are also considered as N(X) values. The number n is dependent upon the maximum number of N(X) expected in the CP message. |

The content of the Checkpoint (CP) message is provided by the application program being executed in the remote station. The frame carrying this message is constructed and transmitted by the control unit in the remote station in a manner similar to that described earlier with reference to the station of FIG. 1.

Upon receipt of the frame containing the CP message, the control unit associated with the local station causes the message, if it accepts same, to be stored in a so-called Retransmit register. It will first be assumed here that bit X in the CP message is zero. In the control unit, a retransmit table look-up operation is initiated as follows. Each N(X) value is compared with the N(S) values in the table to determine whether an equality can be found. If none of the N(S) values is equal to N(X), a so-called Retransmit Indicator bit, which is associated with this particular N(X) and is stored in the retransmit register, is set to "1". If one of the N(S) in the table is equal to N(X), the variable V(T) associated with this N(S) is compared with the N(R) in the CP message. If the V(T) value is equal to or greater than N(R), no action is taken with respect to the frame whose send sequence number is said N(S). If the V(T) value is less than N(R), the retransmit indicator bit associated with N(X) is also set to "1". If bit X in the CP message is one, all values which lie between N(R) and the highest N(X) are also considered as N(X) values. Upon completion of the above processing of the CP message, the retransmit register will contain the sequence numbers N(S) of those frames which are to be retransmitted or to be held for future retransmission.

The control unit sets to "1" a so-called Attention bit in its status 8-bit byte and raises Request In line 241 to signal to the channel that it is ready to transmit status information. The Attention bit exists in the status byte of the channels of the IBM System/360 and IBM System/370 computers. When selected in the manner described earlier, the control unit places the status byte on input bus 20 and raises Status In line 23. The channel requests CPU 6 to initiate an I/O interruption by raising Interruption Request line 14 and waits for CPU 6 to raise Interruption line 11. The channel then places on storage data input bus 16 the conditions that caused the interruption and in particular the control unit 8-bit status byte in the CSW. The application program detects the Attention bit and requests the control unit to initiate a Sense operation. This is an operation conventionally performed in computers such as the IBM System/360 and IBM System/370 and is similar to the Read operation described above. Upon detecting a Sense command, the control unit places on input bus 20 the content of the retransmit register, which is transferred to the main storage of the computer. The application program causes those information frames whose N(S) is equal to one of the N(X) values received from the retransmit register and whose retransmit indicator bit is set to "1" to be retransmitted and frees those storage locations which contain frames whose N(S) does not correspond to any of the received N(X) regardless of the value of the retransmit indicator bit associated therewith. Bit R in the control (C) field of retransmitted frames is set to "1" to indicate a retransmission. Upon receipt of an information frame to be retransmitted, the control unit updates the value of the V(T) associated with the N(S) of that frame.

The operation of the present invention is illustrated by way of example in the Appendix. In this example, it is assumed that the round-trip propagation delay between the stations is equal to the time interval required to transmit 39 information frames and that a Checkpoint (CP) message is transmitted by the remote station whenever ten frames have been received.

The send sequence numbers, N(S), of the frames being transmitted are shown as 00, 01, ..., etc.; the "x" that follows some of these numbers indicates that the corresponding frame is incorrect, and the "r" that precedes some of the numbers indicates a retransmission. In this example, the value of the variable V(T) associated with a retransmitted frame will be one greater than the N(S) of the preceding, non-retransmitted frame. This V(T) value represents the order in which the frame is retransmitted relative to the sequence of frames transmitted for the first time.

The local station successively transmits frames numbered 00, 01, ..., etc. After receiving the frame whose N(S) is 09, the remote station will transmit its first CP message, which, assuming that frame 03 (for example) was incorrect, will contain the indications N(R)=10, N(X)=03. (For the purposes of this example, the previously mentioned X bit will be ignored).

In the Appendix, this message is shown as

CP 10 (03)

Because of the propagation delay, this message will only be received by the local station after 48 frames have been transmitted. Since frame 03 has not yet been retransmitted, the local station will retransmit frame 03 after frame 48 and change the value of the variable V(T) associated with that frame to 49. It will then transmit frames 49, 50, ..., etc. After transmitting frame 57, the local station will receive the message

CP 20 (03)

sent by the remote station after receiving frame 19. This message will still contain N(X)=03 because, at the time it was sent, the remote station has not yet received retransmitted frame 03. Since the value of the V(T) associated with N(S)=03 is now equal to 49 and is therefore higher than that of the N(R) stated in the CP message, i.e. 20, the local station will not retransmit frame 03 and the next frames to be transmitted will be frames 58, 59, .... After transmitting frame 67, the local station will receive the message

CP 30 (26 25 03)

sent by the remote station after receiving frame 29. This message will still include N(X)=03 since, at the time it was sent, the remote station had not yet received retransmitted frame 03, and will further include N(X)=25 and N(X)=26. The local station will retransmit frames 25 and 26 after frame 67 and will change the V(T) value associated with frames 25 and 26 to 68. Since the V(T) value associated with N(S)=03 is 49, which is greater than that of the N(R) in the CP message, i.e. 30, the local station will not retransmit frame 03 and will transmit frames 68, 69, ..., and so forth.

When the local station receives the message

CP 49 (45 26 25)

which no longer contains N(X)=03, thereby indicating that the frame whose N(S) is equal to 03 has been received by the remote station, "N(S)=03" in the retransmit table will be erased and the storage location containing this frame will be freed. The frames whose N(S) values are 25 and 26 will not be retransmitted because they already have been retransmitted and because their V(T) value is 68, which is greater than that of N(R), i.e. 49. The frame corresponding to N(S)=45 will be retransmitted because it has never been retransmitted before.

Figure 10:
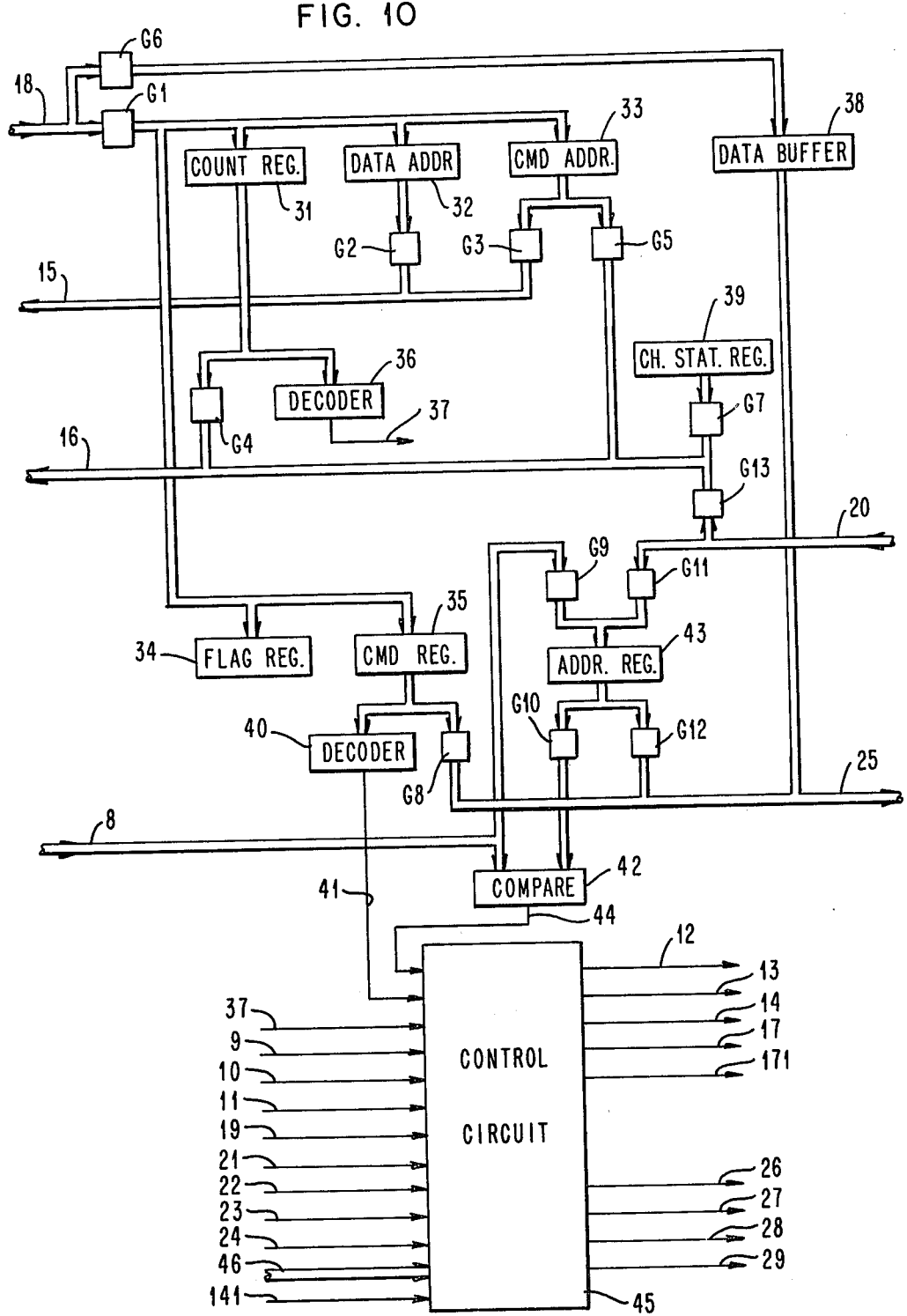
FIG. 10 illustrates an exemplary embodiment of the channel 7 of FIG. 1.

Referring now to FIG. 10, there is shown an exemplary embodiment of the channel 7 of FIG. 1. The channel illustrated in FIG. 10 is a simplified version of the channel described in U.S. Pat. No. 3,488,633, "Automatic Channel Apparatus," of L. E. King et al, assigned to this assignee, reference to which is suggested.

The main storage data output bus 18 is connected through a gate G1 to a Count register 31, a Data Address register 32, a Command Address register 33, a Flag Bits register 34, and a Command Code register 35. The outputs of registers 32 and 33 are respectively connected through a couple of gates, G2 and G3, to main storage addres bus 15. The outputs of registers 31 and 33 are respectively connected through a couple of gates, G4 and G5, to main storage data input bus 16. The output of register 31 is further connected to a decoder 36, which provides a signal on a line 37 whenever the content of register 31 is zero. Bus 18 is further connected through a gate G6 to the input of a data buffer 38 which has its output connected to output bus 25. A channel status register 39 has its output connected to bus 16 through a gate G7. The output of register 35 is connected to a decoder 40, which provides a signal on a line 41 whenever the command code stored in register 35 is a Write code, and also to output bus 25 through a gate G8. Address bus 8 is connected to an input of a comparator 42 and, through a gate G9, to the input of a unit address register 43 which has its output connected through a gate G10 to the other input of comparator 42, which provides a match signal on a line 44 whenever its two inputs are identical. The input of register 43 is also connected through a gate G11 to input bus 20. The output of register 43 is further connected through a gate G12 to output bus 25. Input bus 20 is connected to main storage data input bus 16 through a gate G13. A logic control circuit 45 receives as inputs the lines 9–11, 19, 21–24, 241 and 37, as well as the content of the status register 39 via a bus 46, write line 41, match line 44, and the flag bits stored in register 34 via lines not shown. The outputs of circuit 45 consist of lines 12–14, 17, 171, 26–29 and the control lines of gates G1–G13, which have not been illustrated.

The operation of the device illustrated in FIG. 10 will now be described.

To transmit a SACM command, CPU 6 raises lines 9 and 10 and places the unit address on address bus 8. Control circuit 45 detects the condition of lines 9 and 10 as well as the channel status information present on bus 46, and, if the channel is not busy, places an appropriate condition code, such as 00, on Status lines 12 and 13 and raises the control line of gate G9, which is thus enabled. The unit address present on bus 8 is thus loaded into unit address registrer 43 and into an input register (not shown) of comparator 42. Circuit 45 then raises Write Request line 17 and the control line of gate G3, thereby causing the address of the CAW contained in command address register 33 to be placed on main storage addres bus 15. When main storage 5 raises Acceptance line 19, circuit 45 raises the control line of gate G1, and the address contained in the CAW, which address is available on main storage data output bus 18, is stored in register 33. Circuit 45 then raises Write Request line 17 and the control line of gate G3, and places on bus 15 the address stored in register 33. When main storage 5 responds by raising Acceptance line 19, circuit 45 raises the control line of gate G1, and the contents of the Command Code, Data Address, Flags and Count fields of the CCW associated with the SACM command and present on bus 18 are respectively stored in registers 35, 32, 34 and 31. Circuit 45 then raises Address Out line 27, Select Out line 29 and the control line of gate G12, thereby causing the unit address in register 43 to be placed on output bus 25. When control unit 2 raises Operational In line 21 and Address In line 22, circuit 45 raises the control line of gate G11, thereby causing the address on input bus 20 to be stored in register 43. Circuit 45 then raises the control line of gate G10, and the unit address supplied by control unit 2 is compared with the unit address which is provided by the CPU and is available in the input register of comparator 42. If the two addresses are identical, comparator 42 raises match line 44. Circuit 45 detects the condition of line 44 and raises Command Out line 26 and the control line of gate G8, thereby causing the command code to be placed on output bus 25. When the control unit raises Status In line 23, circuit 45 raises the control line of a gate not shown and the status information present on the input bus is loaded into channel status register 39. Circuit 45 responds to the status information stored in register 39 by placing the appropriate code on Status lines 12 and 13. Transmission of the SACM command now begins. When control unit 2 raises Service In line 24, control circuit 45 raises Write Request line 17 and the control line of gate G2, thereby causing the address contained in data address register 32 to be placed on bus 15. When main storage 5 responds by raising Acceptance line 19, circuit 45 raises the control line of gate G6, thus enabling the requested 8-bit byte to be placed on output bus 25 through buffer register 38; circuit 45 also causes the counts of registers 31 and 32 to be decremented and incremented by one, respectively, by means not shown, and raises Service Out line 28.

Since the SACM command comprises a single 8-bit byte, the content of register 31 has a zero value, and decoder 36 raises line 37; when control unit 2 requests another 8-bit byte by raising Service In line 24, control circuit 45 raises Command Out line 26, thereby signaling a stop condition to the control unit. When received by the channel, the conditions Channel End and Device End are stored in status register 39. Upon detecting these conditions, circuit 45 checks the value of the CC flag bit. Since this bit is zero, circuit 45 raises Interruption Request line 14. When the CPU raises Interruption line 11, circuit 45 raises the control lines of gates G4, G5 and G7, thereby transferring the contents of registers 31, 33 and 39 to main storage data input bus 16 to be placed in the CSW.

Channel 7 transfers the various messages and data blocks to control unit 2 in a similar manner using the CCW's associated therewith. Whenever the channel is to perform a Read or a Sense operation, control unit 2 is first selected as described above, using the CCW which controls that operation.

When control unit 2 raises Operational In line 21 and Service In line 24, control circuit 45 raises Read Request line 171 and the control line of gate G2, thereby causing the address contained in data address register 32 to be placed on main storage address bus 15. When main storage 5 responds by raising Address Accepted line 19, control circuit 45 raises the control line of gate G13, thereby allowing the 8-bit byte transferred by control unit 2 over channel input bus 20 to be placed on data input bus 16 in order to be loaded in main storage 5. The channel increments the content of register 31 by one and raises Service Out line 28. The other 8-bit bytes supplied by control unit 2 are transferred in a similar fashion. A Read or Sense operation ends in the same manner as a Write operation.

In addition, when it detects that Request In line 241 is raised, due, for example, to the fact that control unit 2 has received a Checkpoint (CP) message, circuit 45 raises Select Out line 29, and the control unit places its address on input bus 20 and raises Operational In and Address In lines 21 and 22. When the address has been detected by the channel, circuit 45 raises Command Out line 26 and the control unit responds by placing the status byte on input bus 20 and by raising Status In line 23. Circuit 45 raises the control line of a gate not shown and the status byte is loaded into register 39. The channel then requests an interruption to transfer this byte to main storage. The application program in the computer is then informed of the content of the status byte and may initiate, for example, a Sense operation.

Figure 11:
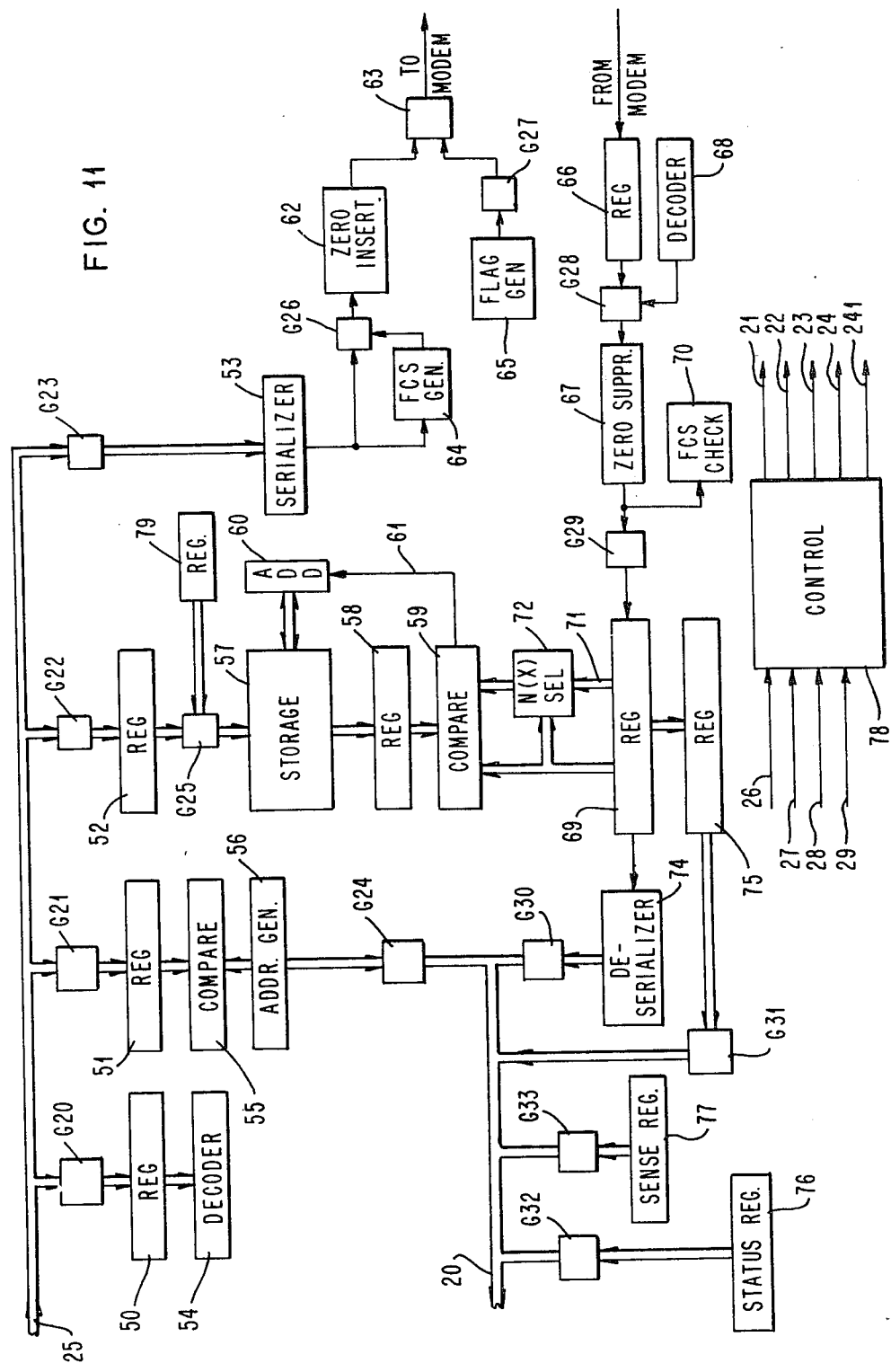
FIG. 11 illustrates an exemplary embodiment of the control unit 2 of FIG. 1.

Referring now to FIG. 11, an exemplary embodiment of the control unit 2 of FIG. 1 is shown. The control unit of FIG. 11 is a simplified version of the IBM 2701 Data Adapter Unit which has been modified to incorporate the present invention. For more details on the IBM 2701 Data Adapter Unit, reference may be made to the document entitled "Component Description: IBM 2701 Data Adapter Unit", File No. 2701-02, 02, Form GA 22-6864-5.

The output bus 25 from channel 7 is connected through gates G20–G23 to a control register 50, an address register 51, a control field register 52 and a serializer 53, respectively. Control register 50 is connected to a decoder 54. Address register 51 is connected to one input of a comparator 55 which has its other input connected to an address generator 56. This generator is also connected to input bus 20 of channel 7 through a gate G24. Register 52 is connected to the input of a storage 57 through a gate G25. The output of storage 57 is connected to an output register 58, inself connected to a comparison logic 59. Read and Write operations are performed in storage 57 under the control of an addressing circuit 60 connected to comparison logic 59 via a line 61. Serializer 53 has its output connected through a gate G26 to a Zero Insertion device 62 of conventional design that is widely used in terminals employing the HDLC procedure. Device 62 has its output connected through an OR gate 63 to the modem associated with the station. The output of serializer 53 is also connected to a Frame Check Sequence (FCS) generator 64, which is also a conventional device widely used in terminals employing the HDLC procedure. A flag generator 65 is connected to another input of OR gate 63 through a gate G27. The modem associated with the station has its output connected to a buffer register 66 capable of storing an 8-bit byte and whose output is connected through a gate G28 to a Zero Suppress device 67, which is the reciprocal of device 62. Register 66 is also connected to a decoder 68. Device 67 has its output connected to a FCS checking device 70, which is the reciprocal of device 64, and, through a gate G29, to a buffer register 69 capable of storing an 8-bit byte. Buffer register 69 is connected via a bus 71 to a N(X) Selection logic 72 which has its output connected to comparison logic 59. Buffer register 69 is also connected via a bus 73 to both logics 59 and 72, and has its output connected to a deserializer 74 whose output is connected to input bus 20 through a gate G30. Buffer register 69 is further connected to a retransmit register 75 which has its output connected to input bus 20 through a gate G31. A status register 76 and a Sense register 77 are connected to bus 20 through gates G32 and G33, respectively. A control logic circuit receives as inputs lines 26–29 and, via lines not shown, status information relating to the components of the device of FIG. 11, and has as outputs lines 21–24 and 241 as well as the control lines (not shown) of gates G20-G33. A register 79 is connected to storage 57 through gate G25.

The control unit is activated when channel 7 raises Address Out line 27 and Select Out line 29 and places the unit address on output bus 25. Control circuit 78 detects the condition of lines 27 and 29 and raises the control line of gate G21, thereby allowing the unit address present on bus 25 to be stored in address register 51 in order to be compared with the unit address generated by device 56. If the two addresses match, control circuit 78 responds by raising Operational In line 21 and Address Out line 22 as well as the control line of gate G24, thereby placing the unit address generated by device 56 on input bus 20. When channel 7 raises Command Out line 26 and places the command code on output bus 25, control circuit 78 raises the control line of gate G20, thereby transferring the command code in the current CCW to register 50.

When the station is transmitting frames, whether these be information, unnumbered or supervisory frames, the CCW command code is a Write code. Upon detecting this code, decoder 54 signals control circuit 78, which raises the control line of gate G27, and flag generator 65 generates the frame beginning flag which is sent to the modem through OR gate 63. Control circuit 78 then raises Service In line 24 and the control line of gate G23. The 8-bit byte thus placed by the channel on output bus 25 is the remote station address; this address is then serialized by serializer 53 and sent to the modem through device 62 and OR gate 63. When serializer 53 is empty, control circuit 78 again raises Service In line 24 and the control line of gate G23 to enable the second 8-bit byte supplied by the channel to be transmitted, and so forth. When control circuit 78 raises Service In line 24 and when the channel responds by raising Command Out line 26 to indicate that it has no further 8-bit bytes to transmit, circuit 78 raises the control line of gate G26, and the frame check sequence (FCS) provided by generator 64 is sent to the modem. The ending flag is then sent to the modem through gate G27 and OR gate 63. Circuit 78 then raises Status In line 23 and the control line of gate G32, thereby causing the content of status register 76, in which the conditions Channel End and Unit End have been set, to be placed on input bus 20.

The three 8-bit bytes that follow the first byte supplied by the channel are also loaded into register 52 through gate G23. The first of these three bytes is the first byte in the control (C) field of the frame. When control circuit 78 detects that the first bit of this first byte is set to "0", which indicates that the frame involved is an information frame (FIG. 7), and that the R bit is set to "1", the other two bytes in register 52 that make up the send sequence number, N(S), of the frame are stored in the retransmit table contained in storage 57 through gate G25 and under the control of addressing circuit 60.

Control circuit 78 set the V(T) value in register 79 as follows. If bit R in register 52 is zero, the V(T) value in register 79 is equal to the integer that is immediately greater than the N(S) value contained in register 52. The V(T) value thus defined is set in register 79 after the corresponding frame has been transmitted. If bit R is one the V(T) value in register 79 remains unchanged.

The variable V(T) is set by control circuit 78 in the retransmit table contained in storage 57 in the following manner. If bit R in register 52 is one, the V(T) value in register 79 is copied in the V(T) field associated with the current N(S) value just set in the retransmit table from register 52. If bit R is zero, then the V(T) value in register 79 is not copied in the retransmit table.

The bits received from the modem by the station whose control unit is shown in FIG. 11 are stored in buffer register 66. Upon detecting the presence of a frame beginning flag in register 66, decoder 68 enables gate G28 to allow the bits that follow the flag to be applied to zero suppress device 67 and then stored in buffer register 69. Gate G28 is inhibited when decoder 68 detects an ending flag. It should be noted that the flags do not reach the devices located downstream of gate G28 and that gate G29 is controlled in such a way as to prevent the content of the FCS field of the received frame from being loaded into register 69.

Whenever the frame stored in register 69 is found to be in error by (for example) FCS checking device 70, the content of the register is erased.

Upon detecting the presence of a UA response in the control field of the frame stored in register 69, control circuit 78 waits for a Read operation to be initiated by the channel. When the control unit has been selected in the manner described above and when decoder 54 detects the presence of a Read command in control register 50, control circuit 78 raises Operational In line 21 and the control line of gate G30 and the UA response is transferred to the channel via input bus 20.

Upon detecting the presence of a CP message within buffer 69, control circuit 78 causes the message to be stored in retransmit register 75 and applies its N(R) to comparison logic 59 and to N(X) selection logic 72 via bus 73. If bit X in the CP message is zero, selection logic 72 transfers the first N(X) in the message to comparison logic 59. Addressing circuit 60 then initiates a retransmit table look-up operation to determine whether the table contains an N(S) equal to the first N(X). To this end, the rows of the table are successively read and the N(S) values compared with the first N(X) in logic 72. If none of the N(S) is found to be equal to the first N(X), the retransmit bit contained in register 75 and associated with the first N(X) is set to "1". If one of the N(S) in the table is equal to the first N(X), the V(T) value associated with this particular N(S) is loaded in register 58 to be compared with N(R). If this V(T) value is less than N(R), the retransmit indicator bit contained in register 75 and associated with the first N(X) is set to "1". If this V(T) value is equal to or greater than N(R), the retransmit indicator bit is set to "0". The second N(X) in the CP message stored in register 69 is then applied by selection logic 72 to comparison logic 59, and the above process is repeated until all of the N(X) values in the CP message have been processed.

If bit X in the CP message stored in buffer register 69 is one, those values which lie between N(R) and the highest N(X) are sequentially supplied by selection logic 72 to comparison logic 59, which considers these values as N(X) values. Selection logic 72 then supplies the N(X) values in the CP message stored in buffer register 69 to comparison logic 59.

Control circuit 78 sets to "1" the Attention bit stored in status register 76 and raises Request In line 241. Upon detecting that line 241 is raised, the channel raises Select Out line 29 and control circuit 78 raises Operational In line 21, Address In line 22 and the control line of gate G24, thereby causing the address supplied by generator 56 to be placed on input bus 20. Upon detecting the address, the channel raises Command Out line 26, and control circuit 78 responds by raising Status In line 23 and the control line of gate G32, thus placing the content of status register 76 on input bus 20. The application program determines that the Attention bit is set to "1" and initiates a Sense Operation. Upon detecting the Sense command, which has been loaded into register 50 by the channel, decoder 54 raises the control lines of gates G31 and G33 and successively places the content of the Sense register 77, which includes a Sense operation identifier, and that of retransmit register 75 on data bus 20 to be stored in main storage 5. The application program is informed of the value of N(R) and of that of the N(S) of the frames to be retransmitted. The program frees those main storage locations which contain frames whose N(S) is different from that of the N(X) values received from the retransmit register regardless of the value of the associated retransmit indicator bit, and is less than N(R). The program then initiates the retransmission of those frames whose retransmission has been requested.

Figures 9, 12:
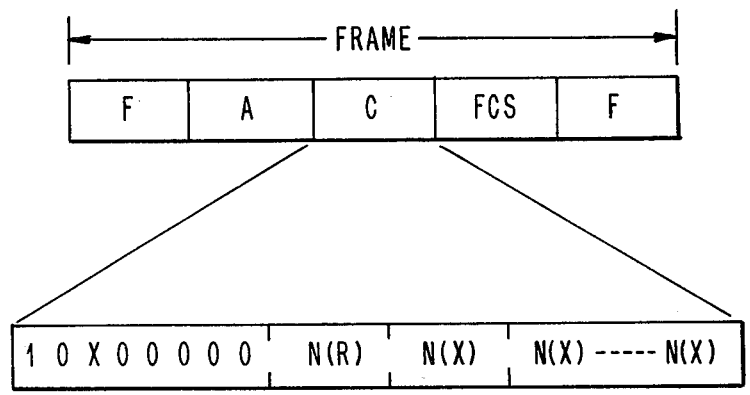
FIG. 9 shows the format of a frame containing a Checkpoint (CP) message.
FIG. 12 shows the content of the receive table stored in main storage 5.

Upon detecting the presence of an information frame in buffer register 69, control circuit 78 waits for the channel to initiate a Read operation, then transfers the frame to main storage 5 through the channel. The application program notes that the frame has been received, using the receive table stored in main storage 5. An exemplary receive table is illustrated in FIG. 12. The table includes the N(S) of expected information frames and associates with each N(S) a receive bit, RCV, that is set to "1" when the frame is correctly received. After a time interval determined by the timing services of computer 1 has elapsed, the application program prepares the Checkpoint (CP) message to be transmitted to the station that sent the information frames. The program notes the N(S) of the most recently received, non-retransmitted, error-free information frame, i.e. the N(S) contained in the receive table which has the highest value and whose associated RCV bit is set to "1", and derives therefrom its N(R); the program then determines, through a receive table lookup operation, the N(S) of incorrect frames whose retransmission will be subsequently requested. After preparing the CP message, the program initiates a Write operation to cause the message to be sent to the station for which it is intended.

While the data station described hereinabove is one in which the incoming CP messages are processed in the control unit and the outgoing CP messages are prepared by the computer, it will be obvious to those skilled in the art that these tasks could be reapportioned between the control unit and the computer without departing from the spirit and scope of the invention.

While the invention has been particularly shown and described with reference to a preferred embodiment thereof, it will be understood by those skilled in the art that numerous changes in form and detail may be made therein without departing from the spirit and scope of the invention.

APPENDIX

| 00 | 01 | 02 | 03x | 04 | 05 | 06 | 07 | 08 | 09 |
|----|----|----|-----|----|----|----|----|----|----|
| 10 | 11 | 12 | 13 | 14 | 15 | 16 | 17 | 18 | 19 |
| 20 | 21 | 22 | 23 | 24 | 25x | 26x | 27 | 28 | 29 |
| 30 | 31 | 32 | 33 | 34 | 35 | 36 | 37 | 38 | 39 |
| 40 | 41 | 42 | 43 | 44 | 45x | 46 | 47 | 48 | |

CP 10 (03)

| 10 | 11 | 12 | 13 | 14 | 15 | 16 | 17 | 18 | 19 |
|----|----|----|----|----|----|----|----|----|----|
| 20 | 21 | 22 | 23 | 24 | 25x | 26x | 27 | 28 | 29 |
| 30 | 31 | 32 | 33 | 34 | 35 | 36 | 37 | 38 | 39 |
| 40 | 41 | 42 | 43 | 44 | 45x | 46 | 47 | 48 | r03 |
| 49 | 50 | 51 | 52 | 53 | 54 | 55 | 56 | 57 | |

CP 20 (03)

| 20 | 21 | 22 | 23 | 24 | 25x | 26x | 27 | 28 | 29 |
|----|----|----|----|----|-----|-----|----|----|----|
| 30 | 31 | 32 | 33 | 34 | 35 | 36 | 37 | 38 | 39 |
| 40 | 41 | 42 | 43 | 44 | 45x | 46 | 47 | 48 | r03 |
| 49 | 50 | 51 | 52 | 53 | 54 | 55 | 56 | 57 | 58 |
| 59 | 60 | 61 | 62 | 63 | 64 | 65 | 66 | 67 | |

CP 30 (26 25 03)

| 30 | 31 | 32 | 33 | 34 | 35 | 36 | 37 | 38 | 39 |
|----|----|----|----|----|----|----|----|----|----|
| 40 | 41 | 42 | 43 | 44 | 45x | 46 | 47 | 48 | r03 |
| 49 | 50 | 51 | 52 | 53 | 54 | 55 | 56 | 57 | 58 |
| 59 | 60 | 61x | 62 | 63 | 64 | 65 | 66 | 67 | r25 |
| r26 | 68 | 69 | 70 | 71 | 72 | 73 | 74 | 75 | |

CP 40 (26 25 03)

| 40 | 41 | 42 | 43 | 44 | 45x | 46 | 47 | 48 | r03 |
|----|----|----|----|----|-----|----|----|----|-----|
| 49 | 50 | 51 | 52 | 53 | 54 | 55 | 56 | 57 | 58 |
| 59 | 60 | 61x | 62 | 63 | 64 | 65 | 66 | 67 | r25 |
| r26 | 68 | 69 | 70 | 71 | 72 | 73 | 74 | 75 | 76 |
| 77 | 78 | 79 | 80 | 81 | 82 | 83 | 84 | 85 | |

CP 49 (45 26 25)

| 49 | 50 | 51 | 52 | 35 | 54 | 55 | 56 | 57 | 58 |
|----|----|----|----|----|----|----|----|----|----|
| 59 | 60 | 61x | 63 | 63 | 64 | 65 | 66 | 67 | r25 |
| r26 | 68 | 69 | 70 | 71 | 72 | 73 | 74 | 75 | 76 |
| 77 | 78 | 79 | 80 | 81 | 82 | 83 | 84 | 85 | r45 |
| 86 | 87 | 88 | 89 | 90 | 91 | 92 | 93x | 94 | |

CP 59 (45 26 25)

I claim:

1. In a data transmission system in which a transmitting station sends sequentially numbered information frames to a receiving station, each of said frames including a send sequence number (N(S)) and an information field, a system for retransmitting incorrect frames, characterized in that:

the receiving station includes:
  means (69) for receiving said information frames,
  means (70) for checking received frames for errors,
  means (FIG. 12) for determining the send sequence number (N(S)) of received frames found to be in error,
  means (1, FIG. 12) for sending to the transmitting station a Checkpoint message containing a receive sequence number (N(R)) which indicates the send sequence number (N(S)) of the most recently received, error-free, non-retransmitted information frame, and, if at least one incorrect frame was received, at least one identifier (N(X)) which indicates the send sequence number (N(S)) of said at least one incorrect frame whose retransmission is requested, said Checkpoint message being sent after the receiving station has received a predetermined number of information frames greater than one, and in that:

the transmitting station includes:
  means (69) for receiving said Checkpoint message,
  retransmission means (52, 57, 59, 60, 75) for retransmitting those frames whose send sequence number (N(S)) is equal to one of the identifiers (N(X)) in the Checkpoint message and which have not previously been retransmitted; for associating with each retransmitted frame a variable (V(T)) whose value indicates the order in which the frame is retransmitted relative to the sequence of frames transmitted for the first time; and for retransmitting those frames whose send sequence number (N(S)) is equal to one of the identifiers (N(X)) and which have previously been retransmitted, solely if the value of the variable V(T) associated with such frames is less than that of the receive sequence number (N(R)) in the Checkpoint message, and means (52, 79) for updating the value of the send state variable (V(T)) associated with each retransmitted frame.

2. The method according to claim 1, characterized in that each information frame contains a retransmission (R) bit indicating whether the frame is a retransmission.

3. The method according to claim 1, characterized in that the Checkpoint message includes a bit (X) indicating whether those values which lie between the receive sequence number (N(R)) and the highest of the identifiers (N(X)) are also to be considered as identifiers (N(X)).

4. The system according to claims 1, 2, or 3 characterized in that the Checkpoint messages are sent by the receiving station at regular intervals.

5. In a data transmission system in which a transmitting station sends sequentially numbered information frames to a receiving station, each of said frames including a send sequence number (N(S)) and an information field, a method of retransmitting incorrect frames, characterized in that it includes the steps of:

at the receiving station:
 receiving the information frames,
 checking the received information frames for errors,
 noting the send sequence number (N(S)) of received frames found to be in error, and
 after a predetermined number of numbered information frames greater than one have been received, sending to the transmitting station a Checkpoint message containing a receive sequence number (N(R)) which indicates the send sequence number (N(S)) of the most recently received, error-free, non-retransmitted information frame, and, if at least one incorrect frame was received, at least one identifier (N(X)) which indicates the send sequence number (N(S)) of said at least one incorrect frame whose retransmission is requested, at the transmitting station:
 receiving the Checkpoint message,
 retransmitting those frames whose send sequence number (N(S)) is equal to one of the identifiers (N(X)) in the Checkpoint message and which have not previously been retransmitted, and associated with each retransmitted frame a variable (V(T)) whose value indicates the order in which the frame is retransmitted relative to the sequence of frame transmitted for the first time,
 retransmitting those frames whose send sequence number (N(S)) is equal to one of the identifiers (N(X)) and which have previously been retransmitted, solely if the value of the variable (V(T)) associated with such frames is less than that of the receive sequence number (N(R)) in the Checkpoint message, and
 updating the value of the variable (V(T)) associated with each retransmitted frame.

6. The system according to claim 5, characterized in that each information frame includes a retransmission (R) bit indicating, when it has a predetermined value, that the frame is a retransmission, and in that said retransmission means include:

means (57) for determining the value of the retransmission (R) bit in those frames whose send sequence number is equal to one of the identifiers (N(X)), and means (57, 59, 60, 75) for retransmitting those of such frames in which the value of the retransmission (R) bit is the opposite of said predetermined value, and those in which the retransmission (R) bit has said predetermined value and in which the value of the associated variable (V(T)) is less than that of the receive sequence number (N(R)) in the Checkpoint message.

7. The system according to claim 5, characterized in that the Checkpoint message includes a bit (X) indicating whether those values which lie between the receive sequence number (N(R)) and the highest of the identifiers (N(X)) are also to be considered as identifiers (N(X)).

8. A method according to claims 5, 6 or 7 characterized in that the receiving station transmits Checkpoint messages at regular intervals.

* * * * *